United States Patent [19]
Clark

[11] Patent Number: 6,004,652
[45] Date of Patent: Dec. 21, 1999

[54] STRUCTURAL DIMPLE PANEL

[76] Inventor: Brian Hall Clark, 205 Santa Clara, Brisbane, Calif. 94005

[21] Appl. No.: 08/713,519

[22] Filed: Sep. 13, 1996

[51] Int. Cl.⁶ ........................................................ B32B 3/10
[52] U.S. Cl. .......................... 428/133; 428/137; 428/138; 428/178; 52/789.1
[58] Field of Search ............................. 428/178, 76, 133, 428/137, 138, 120; 52/784.1

[56] References Cited

U.S. PATENT DOCUMENTS

| | | | |
|---|---|---|---|
| 3,142,599 | 7/1964 | Chavennes | 428/178 |
| 3,231,454 | 1/1966 | Williams | 428/178 |
| 3,462,330 | 8/1969 | Grey et al. | 428/178 |
| 3,955,019 | 5/1976 | Keith | 428/35 |
| 4,181,548 | 1/1980 | Weingarten | 428/178 |
| 5,196,254 | 3/1993 | Akiyama | 428/198 |

FOREIGN PATENT DOCUMENTS

| | | |
|---|---|---|
| 0 634 534 | 1/1995 | European Pat. Off. . |
| 17 84 565 | 10/1971 | Germany . |
| 90 15 521 | 3/1991 | Germany . |
| 1 132 593 | 11/1968 | United Kingdom . |
| 1 363 536 | 8/1974 | United Kingdom . |

*Primary Examiner*—Donald Loney
*Attorney, Agent, or Firm*—Burns Doane Swecker & Mathis, L.L.P.

[57] ABSTRACT

A panel having one or more dimple layers connected together by one or more reinforcing layers engaging ends of dimples on the dimple layer to create a cavity between the layers. The connection of the dimple layer and reinforcing layers creates an integral structural panel that can be planar by having identical heights of the dimples on the dimple layer to create a planar panel (flat) or nonplanar (curved) by varying the heights of the dimples on the dimple layer or through planar spacing adjustment. The panel can be modified in various ways such as by choice of materials and/or geometries of the various layers and/or incorporation of additional structural features.

28 Claims, 10 Drawing Sheets

STRUCTURAL DIMPLE PANEL

FIELD OF THE INVENTION

The invention relates to a structural panel which can combine structural capability with a variety of materials, geometries, or dimensions, and create a cavity between one or more layers.

BACKGROUND OF THE INVENTION

Known structural panels include honeycomb and open celled structures. Honeycombs can be filled to provide strength and uniformity of structure and are typically lightweight. Open celled products, on the other hand, generally lack structural strength and are meant to contain and control fluids and/or liquids. Examples of structural panels can be found in U.S. Pat. Nos. 2,441,476; 2,481,046; 3,029,910; 3,354,021; and 4,631,221. It would be desirable to provide a structural product which combines the structural properties of a honeycomb and containment capability of open celled products with the additional advantages of material, geometry and dimension choices.

SUMMARY OF THE INVENTION

The invention provides a manufacturable, structural panel that can be produced in many sizes, configurations, and materials. This panel can be used to solve structural and construction problems while cavities therein can be used to hold, control or transport materials. The panel includes a first layer in the form of a dimple layer that is structurally connected to a second layer in the form of a reinforcing layer. The assembled dimple layer and reinforcing layer form a dimple panel. The dimple layer can include dimples on one or both sides thereof. When the dimple layer is connected to the reinforcing layer to form a structural panel, cavities are created between the dimple layer and the reinforcing layer. The dimple layer having dimples on only one side thereof (single-sided dimple layer) forms two cavities wherein the first cavity is inside the dimples and the second cavity is outside the dimples and enclosed by the first side of the dimple layer and the reinforcing layer. The dimple layer having dimples on both sides (double-sided dimple layer) thereof can be attached between first and second reinforcing layers to form two cavities wherein the first cavity is inside the dimples on one side thereof as well as outside the dimples on the cavity being enclosed by one of the reinforcing layers. The second cavity is a mirror image of the first cavity. A variety of shapes, sizes, and geometries are possible. Single-sided dimple layers, double-sided dimple layers, and reinforcing layers can be produced in many materials and mixed and matched within any panel. The spacing of the connections on each reinforcing layer can vary to create overall panel structures from planar (flat) to nonplanar, (curved or cylindrical) panels. Multiple single and double-sided dimple layers can be stacked in any combination and may use reinforcing layers that are common to and connect with two dimple layers, one on either side.

The dimple panels can be load bearing. Their design allows for a variety of materials placed and shaped where needed to meet structural or mechanical requirements. The cavity between dimple layers and reinforcing layers can be filled, left empty, or serve the sole purpose of holding the dimple layers and reinforcing layers apart. Another feature is the cavity between dimple layers and reinforcing layers. The cavity can be used to, but is not limited to, transport, hold, thermally transfer, or route material, fluids and/or liquids.

The choice of manufacturing technique and materials will depend upon the requirements of the products produced according to this invention. The manufacturing method chosen to produce dimple layers and reinforcing layers will also depend upon the material selection and product size. The manufacturing processes used to produce dimple layers and reinforcing layers, are not limited to, but may include techniques by which the parts are formed, stamped, molded, cast, fabricated, constructed, welded, laminated, deposited, sprayed, and/or coated. Small parts might be injection molded, while very large parts might be cast from molds in materials such as concrete, constructed in materials such as metal, or laminated in materials such as reinforced thermosets.

Typical material choices might be, but are not limited to paper and pulp, fibers both natural and synthetic, wood and cellulose, clay, ceramics, concrete, plaster, plastics both thermoplastic and thermosets, composites and laminates, rubbers, and metals both ferrous and nonferrous. Typical examples might be, but are not limited to, engineered thermoplastics using a continuous packaging process such as SMT (surface mount technology) or linear vacuum forming, to become a variety of products from, inflatable greenhouses to rigid wall, ceiling, and floor panels. Injection molded rubber panels could be flexible or form fitting products for both the medical or pipe repair industry. These products might also be reusable and/or reenterable. Rigid materials such as ceramics or metal could become pipe, storage tanks, containers, or other shaped products. Products with requirements of high strength per weight might include dimple panels constructed of laminates or composites. Large architectural, structural, and construction products may be fabricated in metal or cast in concrete.

A unique application of this invention is to combine different or dissimilar materials within one panel. Two examples are: a roof section wherein the exterior layer is metal that is connected to a double-sided dimple layer of engineered plastic, while the inside layer is drywall; or the hull of a pleasure craft with an outside layer of reinforced plastic (RFP) is connected to a double-sided dimple layer of paper, pulp or fibrous material, while the inside layer is wood. Any conceivable material combination and connection may be possible. Successful combinations will depend upon the engineering of the connections between reinforcing layers and dimple layers.

Combinations of dimple layers and reinforcing layers will also vary according to material choices. Typical methods might be, but are not limited to; adhering, bonding, gluing, fusing, fastening, connecting, welding, stamping and casting. For example, if stamped metal parts are used, spot welding might be desired. On the other hand, gluing or heat fusing might work best for thermoplastics. In general, the manufacturing process, the material choice, assembly and connection method will be determined by the product requirements.

DETAILED DESCRIPTION OF THE PREFERRED EMBODIMENTS

Figure 1A:
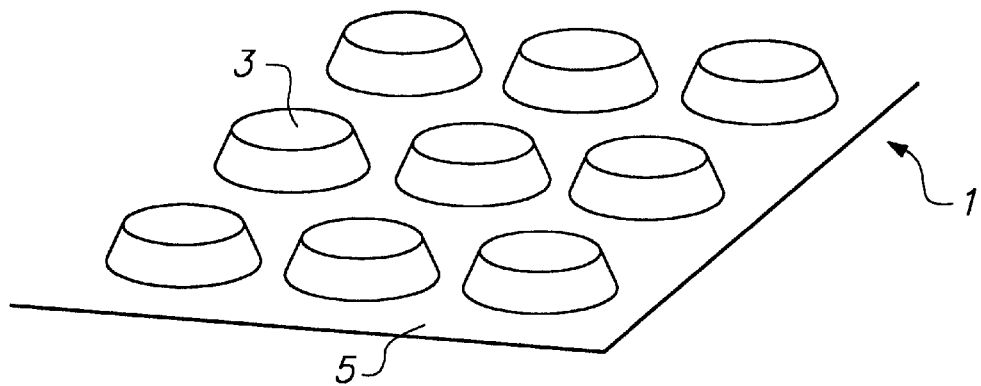
FIGS. 1A–D, are partial perspective and cross sectional views of a single-sided dimple panel embodiment of the invention; showing a single-sided dimple layer, dimple layer with a reinforcing layer peeled away, a single-sided dimple panel, and cross section, respectively.

The invention provides a dimple panel which includes dimples extending from one or both sides of a dimple layer and at least one reinforcing layer attached to the dimple layer so as to form one or more cavities between the reinforcing layer and the dimple layer. Depending on the choice of materials and geometry of the dimple layer and/or reinforcing layer, the layers can be connected to form a light weight structural panel wherein the dimples are solid, hollow, filled or separate pieces. The dimples can have varying sizes, geometries, heights, profiles, dimensions, spacings, densities, and/or arrangement on the dimple layer to provide a wide variety of end products. The dimples can be connected to other dimples, dimple layers and/or reinforcing layers. The dimples and/or dimple layers can be rigid, flexible, hard, soft or have other mechanical and/or structural properties. The dimple layers can be nested, stacked or layered to make complex structures of multilayer devices.

The dimples, dimple layers and dimple panels can vary from extremely small scale (micro) to very large scale (macro) constructions. The dimple shapes can be collapsible to allow the cavity between the dimple layer and reinforcing layer to change or be adjustable. By varying dimple geometry, height, spacing, etc., configurations that create cavities, separation between layers, and guides for the purpose of routing or creating kinetic mixing to a variety of fluids, liquids, materials or products, and/or enhance thermal transfer can be achieved. Materials used in the dimple panel construction can include clear, translucent or color combinations for use in solar or visual applications. The dimples, dimple layers and/or reinforcing layers can include passages for routing of a variety of materials. The dimple panel cavities may be filled or left empty. For instance, passages in the ends of dimples allow for the winding of fibers of various types and configurations around the panel can be used to create a filament wound structure that will withstand high internal pressures. The dimple layer and reinforcing layer connector combinations may be reenterable, and/or reusable, to allow filling, emptying, upgrading and/or retrofitting thereof. The single-sided and double-sided dimple panel configurations can withstand internal or external pressure and/or inflation or compression.

The dimple panel can include various material combinations. For instance, the dimple layer and/or reinforcing layer can be connected to create a flexible panel which becomes rigid when filled with a filler material. Springs or other stored energy or adjustable mechanisms connecting dimples, dimple layers and reinforcing layers can be used to create dynamic and/or adjustable panels. The reinforcing layer can include structural shapes, components and/or additional parts that improve rigidity between dimples. The reinforcing layer can have an exterior finish, environmental protection and/or other special functions. The reinforcing layer can be constructed of a variety of materials, have a variety of surfaces, textures, thicknesses, and properties, or comprise manufactured components.

The dimple layers can have dimple spacing, shapes, materials, structural properties, and/or geometry to create low weight per strength, structural panels. The reinforcing layers and dimple layers can have complimentary connections to connect to other dimple layers or reinforcing layers to create planar, nonplanar, circular or other shaped panels. Memory materials can be used for the dimples, layers and/or other layers which, when recovered, change the shape of the panel to provide various functions such as strain relief, sealing, etc. The dimple panel can provide thermal insulation or thermal transfer depending on the construction thereof. A dimple panel of suitable materials and/or passages can allow sound waves to enter into the panel and be absorbed, defused and/or deflected. The dimple layer can be used as a mold around which a new part is formed and the dimple layer itself can be made by any suitable technique such as molding, press forming, etc. The reinforcing layer can include a track or equivalent connection that complimentents the ends of dimples to allow planar spacing adjustments which result in changes of the panel shape such as from planar to nonplanar.

Figure 1B:
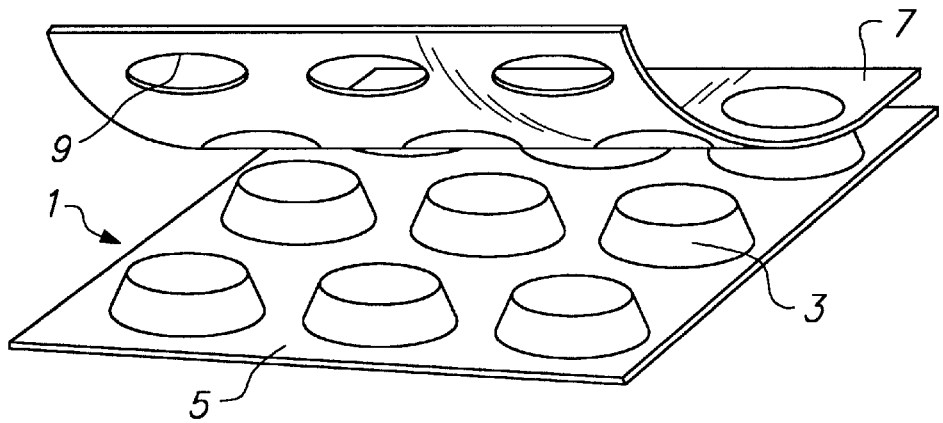

FIGS. 1A–D depict views of a single dimple layer 1, reinforcing layer 7, dimple panel, and cross section. Dimple layer 1 consists of a layer with discrete structures referred to as dimples 3 extending away from the first sides of the layer. Dimple layer 1 can vary from a very small scale to a very large scale and can be made of a suitable material, but not limited to, plastic, paper, wood, metal, rubber or concrete. Likewise, the reinforcing layer is made of a suitable material and is not limited to one specific material or another. Dimple layer 1 may be structural in nature and is capable of meeting structural requirements dependent on the material and configuration used. The ends of the dimples 3 on the single-sided dimple layer 1 can be connected to a reinforcing layer 7, as shown in FIG. 1B.

Figure 1C:
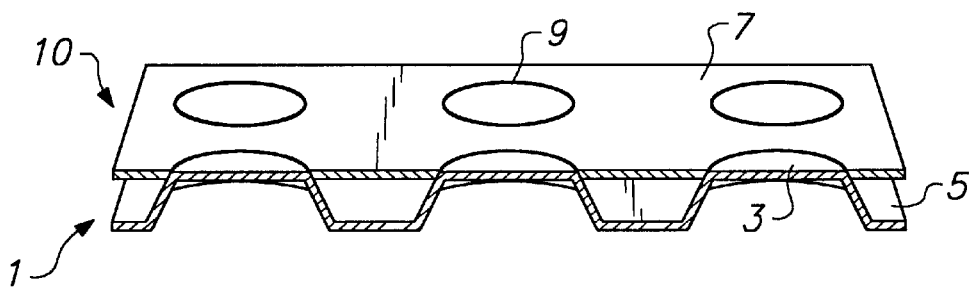
Figure 1D:
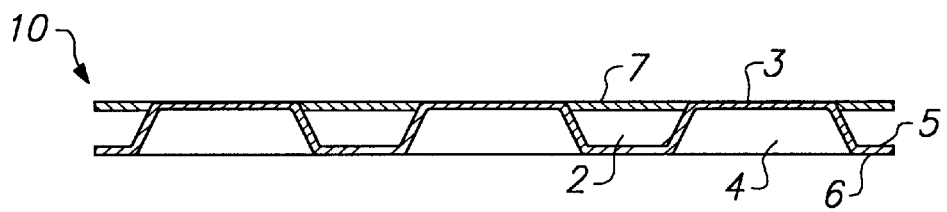

The reinforcing layer 7 has connections that are shown as, but not limited to, connection portions in the form of holes 9 that are complimentary to the dimples 3 in FIG. 1B. FIG. 1C shows the combination of dimple layer 1, and reinforcing layer 7, connected to form a structural dimple panel 10. FIG. 1D is a cross section of a dimple panel 10 that shows cavities 4 inside the dimples 3 on second side 6, and cavities 2 in between the dimples 3 on the first side 5 and enclosed by reinforcing layer 7. In other cases, not shown, dimples 3 may be separate structures, filled, or other than hollow. In those cases, the cavity 4 will not occur. In some cases the individual parts, dimple layer 1, and reinforcing layer 7, provide little or no structure until connected together. In yet other cases, dimple layer 1, alone, can be used as a mold to produce other products.

Figure 2A:
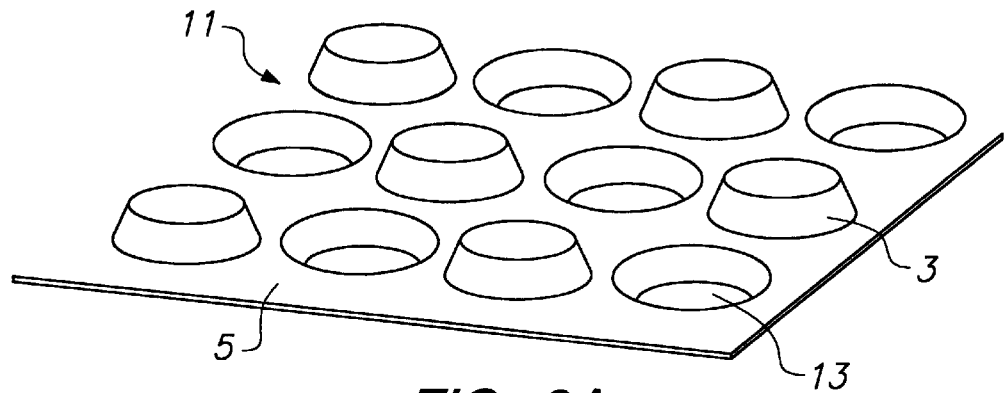
FIGS. 2A–D are partial perspective and cross sectional views of a double-sided dimple panel embodiment of the invention; showing a double-sided dimple layer, dimple layer with two reinforcing layers peeled away, a double-sided dimple panel, and cross section, respectively.
Figure 2B:
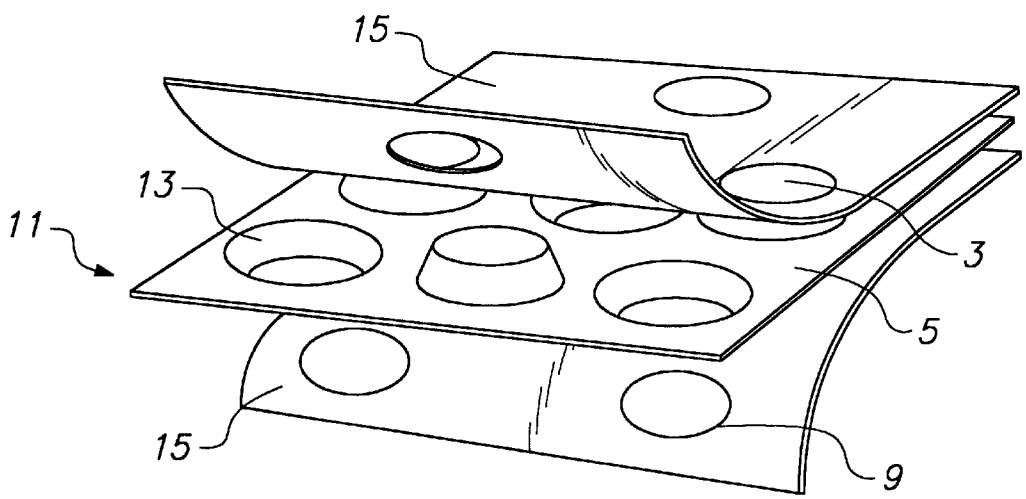
Figure 2C:
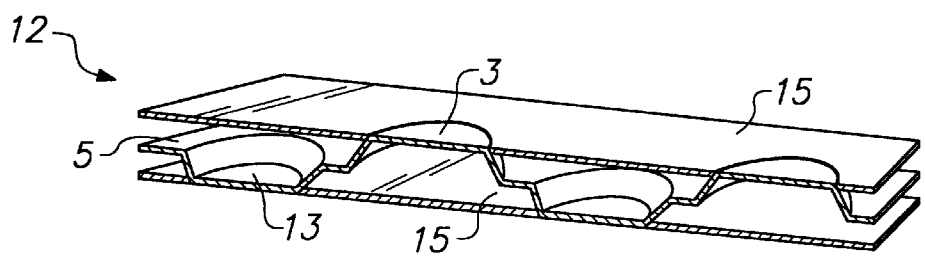
Figure 2D:
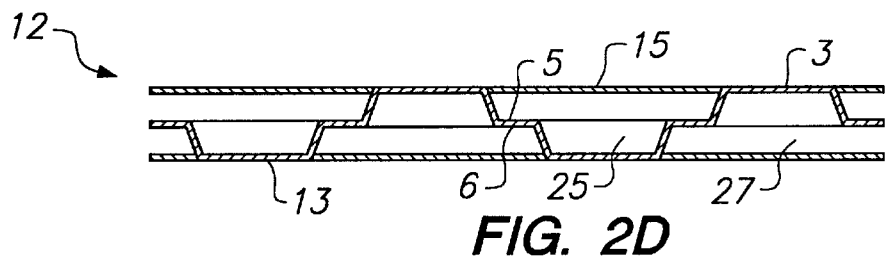

FIG. 2A depicts a multilayer dimple panel wherein a double-sided dimple layer shown generally at 11 with dimples 3 and 13 extending on the first and second side of the dimple layer. As in FIGS. 1A–D, dimple layer 11 is intended to meet a variety of requirements which will determine its material and configuration. Likewise, in FIG. 2B, the ends of the dimples 3 and 13 on the double-sided dimple layer 11 connect with one or more reinforcing layers 15 which have connection portions in the form of holes 9 that are complimentary to dimples 3 and 13. In general, the reinforcing layer connection portions are described throughout the specification as either holes recesses or openings. The holes, recesses and openings are for the purpose of interconnecting dimple layers and reinforcing layers. In contrast, the term "passage" is used throughout the specification for the purpose of describing places where access into or through the dimple panel is created. The spacing of the connections, such as but not limited to holes 9, on each reinforcing layer can vary and are not limited to complimenting the dimples on the dimple layer 11, as shown in FIGS. 2C–D. FIG. 2C depicts double-sided dimple layer 11 and reinforcing layer 15 connected to form panel 12. When connected, two cavities are created, 25, and 27, as shown in 2D. These cavities, 25 and 27, between the dimple layer 11, and reinforcing layers 15, can be filled, or left empty. The dimples 3,13, may serve the purpose of holding the layers apart while connecting the dimple layer and reinforcing layers. As in FIGS. 1A–D, the scale of the double-sided dimple layer 11 and reinforcing layers 15 can vary from micro to macro and are not limited to any specific material or process for their formation. Additionally, when connected together, they become a dimple panel that may be planar or nonplanar. It is understood that the various mechanical features having descriptions which follow are applicable to single or multiple layer dimple panels.

Figure 3A:
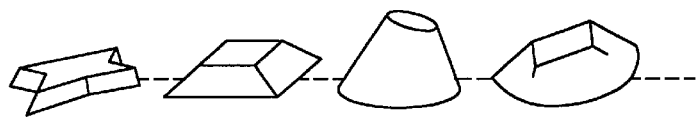
FIGS. 3A–B, 4A–B and 5A–B are perspective and cross sectional views of alternative configurations of dimples, showing alternative dimples with varying shapes, spacing, and uniformity.
Figure 4A:
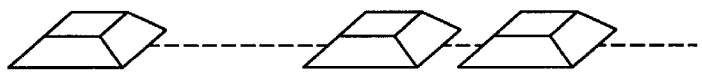
Figure 5A:
Figure 3B:
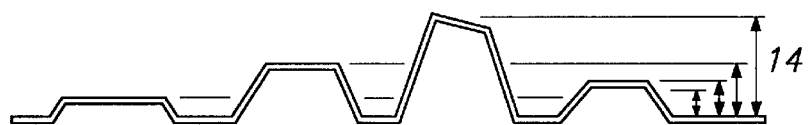
Figure 4B:
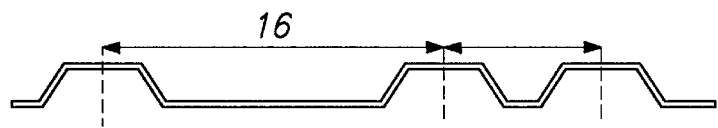
Figure 5B:
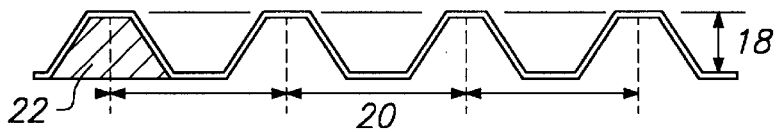

FIGS. 3A–B, 4A–B and 5A–B are partial perspective and cross sectional views of alternative dimple configurations of dimples 3 and 13. FIG. 3A illustrates a row of alternative single-sided dimples with different shapes and heights. FIG. 3B is a cross section of FIG. 3A that indicates dimple height difference 14 and dimple shape variation. As compared to honeycomb structures, the dimple layer can be manufactured in a variety of configurations, not limited to the above examples. FIG. 4A illustrates a row of uniformly shaped dimples with nonuniform spacing between them. FIG. 4B, is a cross section of the spacing differences 16. FIG. 5A illustrates uniform shapes, uniform heights and uniform spacing of dimples. FIG. 5B is a cross section of FIG. 5A illustrating dimples with uniform height 18 and uniform spacing 20. Also shown is an alternate dimple configuration, 22, which represents, but is not limited to a solid, filled, or a separately attached dimple.

Figure 6:
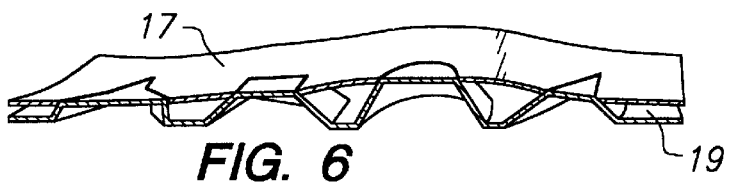
FIG. 6 shows an alternatively configured single-sided dimple layer connected to a complimentary reinforcing layer.

FIG. 6 is a partial perspective view of alternative dimple configurations on a dimple layer 19, connected to a complimentary reinforcing layer 17. This makes a unique dimple panel with variable distance between layers (similar to FIG. 3A). The variety of shapes, heights, and spacing illustrates that a wide range of panels can be generated to solve structural, material flow, space, aesthetic or visual problems. Typical applications of these combinations, but not limited to, would be dimple layers with or without matching reinforcing layers that create kinetic mixing in heat exchangers, and/or variable dimple layer height and spacing to create low weight per strength structural panels.

Figure 7:
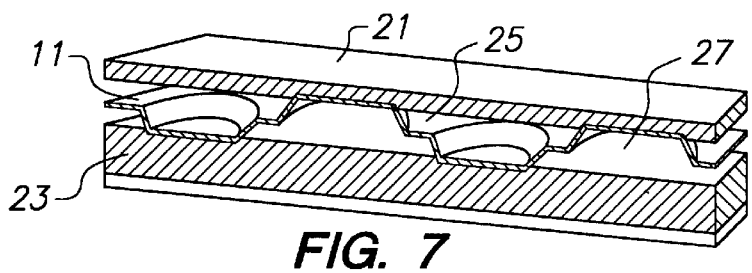
FIG. 7 shows a double-sided dimple layer with alternatively shaped dimples connected to alternatively configured reinforcing layers.

FIG. 7 illustrates a double-sided dimple layer 11 as seen in FIG. 2A with two dissimilar reinforcing layers 21 and 23 of varying thicknesses. This illustrates the possibility of using a variety of materials and thicknesses for the reinforcing layers. As compared to the holes 9 on the reinforcing layers 7 in FIG. 1B, and 15 in FIG. 2B, items 21 and 23 in FIG. 7 can include recesses or other engaging mechanism such as a fastener, adhesive, weld, etc., to illustrate the capability of the reinforcing layers to be many different materials and configurations. For example, in housing construction, one reinforcing layer might be drywall while the other reinforcing layer might be siding or other exterior material. The cavities 25 and 27, as shown in FIG. 2D, can be filled or left empty and could contain HVAC, electrical, plumbing, insulation or any combinations thereof. Additional combinations are endless and can be applied to many industries.

Figure 8A:
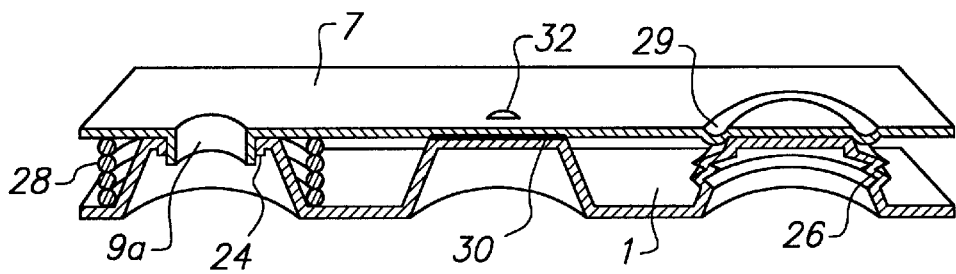
FIG. 8A is a cross sectional view of a single-sided dimple layer connected to a reinforcing layer and with three alternative dimple configurations and alternative connections.

FIG. 8A is a partial perspective view of a single-sided dimple layer 1 with a reinforcing layer 7 similar to what is seen in FIG. 1C as 7. However, featured here, but not limited to, is a reinforcing layer connection 29 which connects the complimentary, collapsible dimple 26 and reinforcing layer together. This connection, as well as many others, enables the panel to be either fixed or re-enterable. Dimple 26, by being collapsible, creates varying distances between layers. Many features, devices and systems can be used to connect dimple layers to reinforcing layers. In general, dimple layers and reinforcing layers can be connected together by means of, but not limited to, adhering, fusing, welding, bonding, gluing 30, or fastening 32. Conversely, while connecting dimple layers and reinforcing layers together, use of a biasing member in the form of a dynamic element such as a spring 28, a dimple with a flanged opening at its end 24, and a flanged hole 9a in the reinforcing layer 7, creates a panel with variable distances between layers and may be used as a stored energy device. As can ben seen in FIG. 8A the end of a dimple which is complimentary with the hole in the reinforcing layer can be reduced in cross section for connection purposes. The reduced cross section enhances alignment adjustment as will be discussed with respect to FIG. 10A. An end with a reduced cross section may comprise an integral fastening portion such as fastener 32. Flexible material, such as, but not limited to, thermoplastics or rubber, may allow the panel to take other forms and shapes besides that of a planar (flat) panel, such as seen in FIG. 6.

Figure 9A:
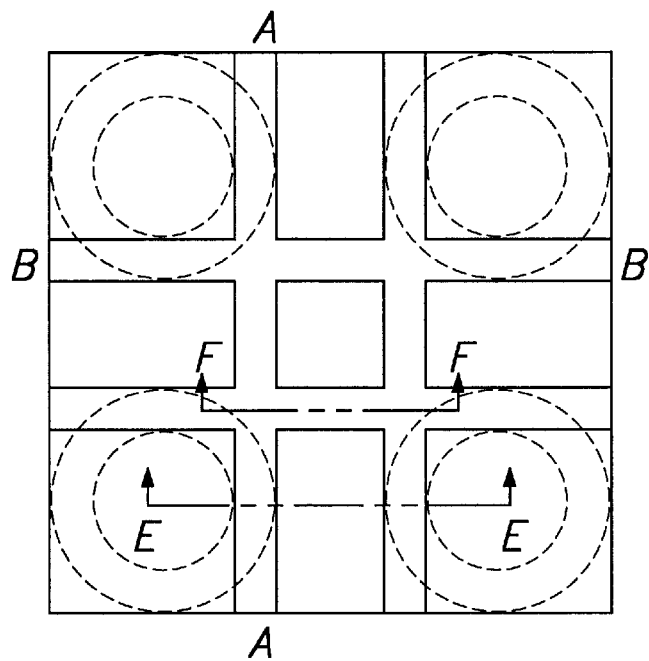
FIGS. 9A–C, are top view and cross sectional views of a single-sided dimple layer with complimentary reinforcing layers, featuring connections as well as structural shapes that enhance rigidity in the space between dimples.
Figure 9B:
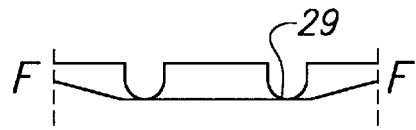
Figure 9C:
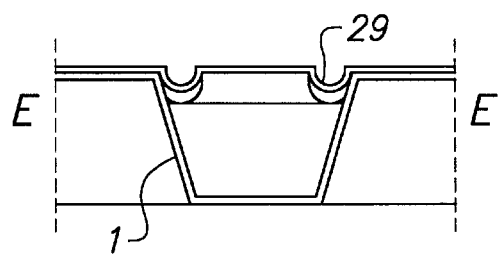

FIGS. 9B–C are cross sections of a reinforcing layer connection 29, while FIG. 9A is a top view of a single-sided dimple layer 1 connected to a reinforcing layer with rigid shapes on both the A—A and B—B axis. Structural shapes can be used to stiffen the reinforcing layer of any single-sided or double-sided dimple panel. Rigidity can be achieved by using a variety of shapes, materials and/or added components and structures. For example, but not limited to, carbon fibers embedded in thermoplastic, rebar embedded in concrete or the addition of other structures. FIGS. 9B–C are cross sections of FIG. 9A showing structural details with FIG. 9B detailing the structures in between the reinforcing layer connections at F—F. FIG. 9C details the structural shape as it connects with dimples from the dimple layer at E—E.

Figure 10A:
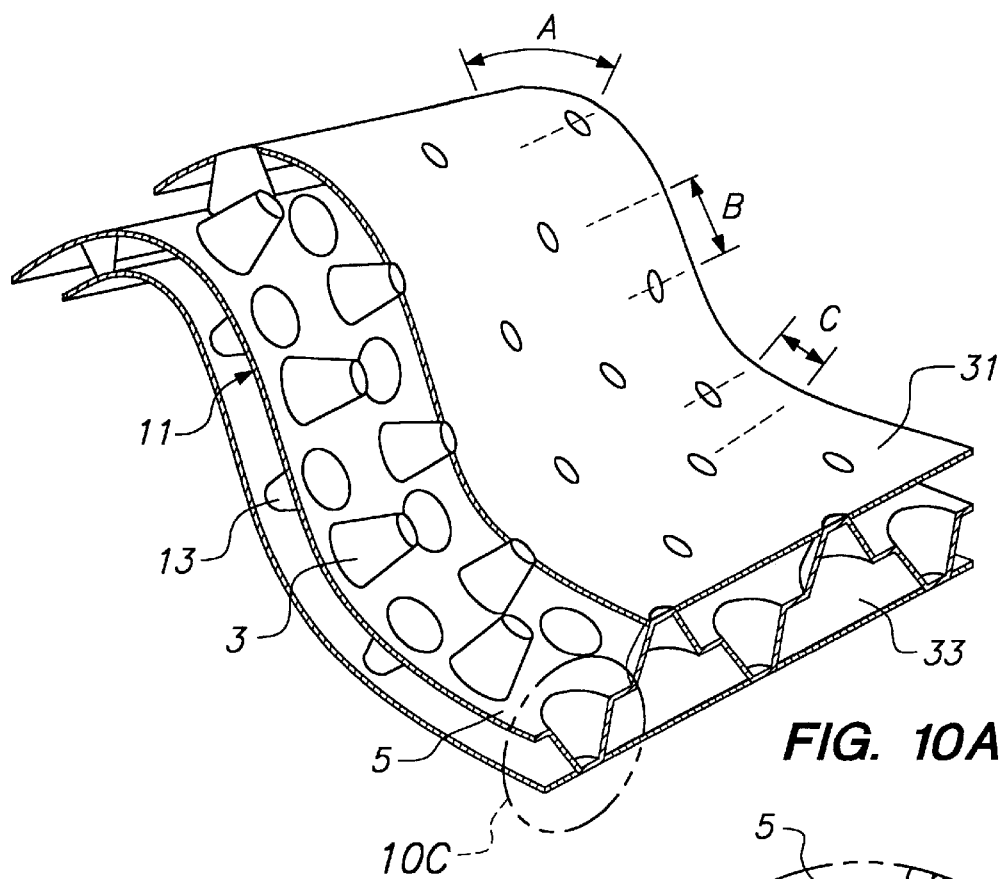
FIGS. 10A–C, are a partial perspective, cross section and diagram of a double-sided dimple panel, showing variable spacing between the complimentary connections on the reinforcing layer and the dimples on the dimple layer, which creates nonplanar panels, and a track or slide detail to allow shape adjustment.
Figure 10C:
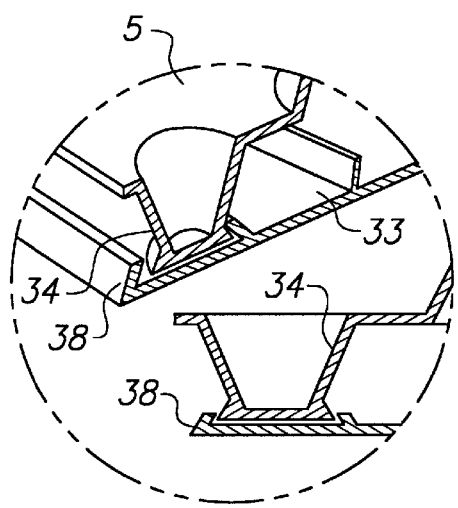
Figure 10B:
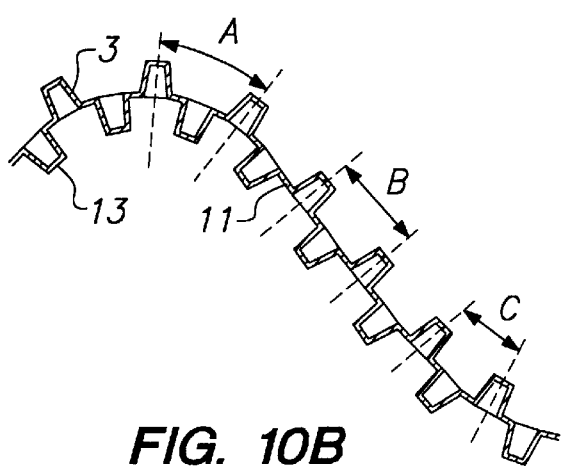

FIGS. 10A–B are partial perspective and cross sectional views of a double-sided dimple layer similar to what is first shown as 11 in FIG. 2A with two reinforcing layers 15. Although the double-sided dimple layer 11 has dimples that are identical in shape, geometry, and spacing, the complimentary connections, shown as holes on the reinforcing layers 31 and 33 vary in spacing A, B and C and connect with the dimples 3 and 13 to form a nonplanar panel. This dimensional relationship between the spacing of dimples and reinforcing layer connections, one from another, respectively determines whether a panel is planar or nonplanar. This dimensional relationship is referred to as planar spacing adjustment. The relative alignment of the dimple layer and the reinforcing layer is therefor varied by changing the spacing of the dimples or the holes, or both, the dimples and the holes. FIG. 10C illustrates in a partial perspective and cross sectional view, a connection system consisting of alternative dimples 34 having fastening portions, extending into first side 5 of dimple layer 11, that lock into complimentary portions 38 of the reinforcing layer 33. This connection system allows for the dimple ends to slide along the complimentary portions 38, varying the shape of the panel from planar to nonplanar. Although dimples 34 are shown to include a fastening portion in the form of a flange and the reinforcing layer 33 includes a slot like complimentary portion 38, it is within the scope of the invention to provide other mechanical interconnections (not shown) such as multiple holes, a slot of partially connected holes and/or with dimples having reduced cross section that will make the dimple panel adjustable. Although not shown here, the spacing differences between the dimples and the reinforcing layer connections can be used on all combinations of single-sided and double-sided dimple panel configurations.

Figure 11:
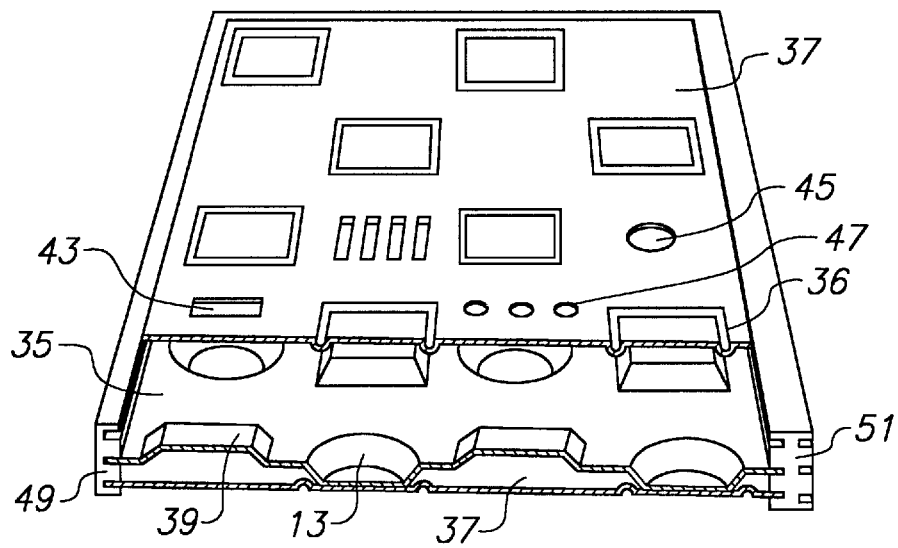
FIG. 11 is a partial perspective of a double-sided dimple panel with two reinforcing layers of varying geometries and surface cutouts. In addition, the double-sided dimple panel is finished on the sides with trim.

FIG. 11 is a partial perspective view with a cut away of a double-sided dimple layer shown generally at 35 and two reinforcing layers 37. Both the round dimple 13 and square dimple 39 connect with square interlocking connections 36. Round and square dimples on the first side and second side of the double-sided dimple layer might be used in applications where different functions on either side are desired. For example, in home construction, the first side might be used for insulation, whereas the second side might enclose a fluid for heat exchange. A selection of holes 43,45,47 enables a panel to become not only a structural panel, such as a partition, but also as a sound abatement product where the sound enters the panel through these passages and is diffused. The materials used to form the layers will dictate the number and patterns of the holes. Additionally, the usages exemplified here are not to be construed as the full extent to which this product may be used. Also shown, are variations of dimple panel trim 49 and 51 which terminates the perimeter of the dimple panel. Dependent on the application of the dimple panel, the materials and shape used for this perimeter trim will vary greatly.

Figure 12A:
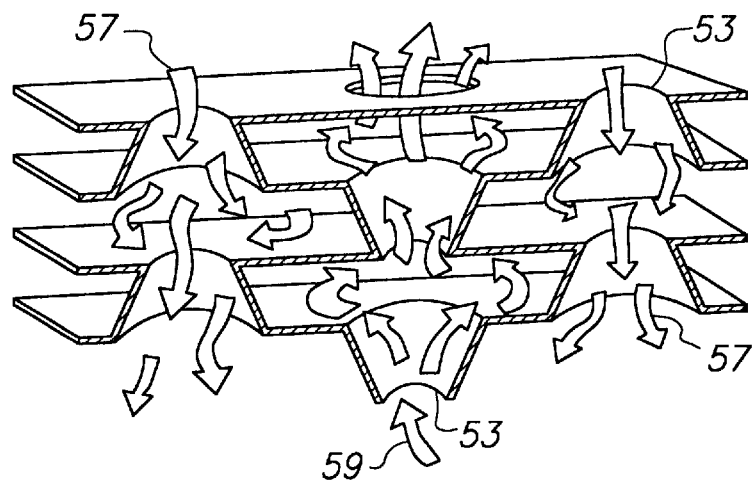
FIGS. 12A–B are cross sections of stacked, double-sided dimple layers and reinforcing layers with open ended dimples and single dimples with varying geometries, and fluid and/or liquid flow patterns.
Figure 12B:
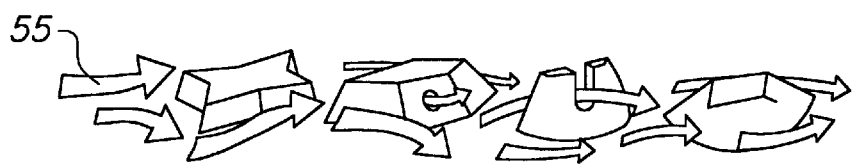

FIG. 12A is a cross section of stacked double-sided dimple layers with passages 53 in the ends of the dimples to allow for the passage of articles, such as, but not limited to, liquids, fluids and cabling. In this embodiment the reinforcing layer engages the dimples of a first dimple layer on the first side of the reinforcing layer and engages the dimples of a second dimple layer on the second side of the reinforcing layer. This example describes a reverse flow heat exchanger wherein two fluids 57 and 59 move in opposing directions in adjacent dimples on the same dimple layer. FIG. 12B is a diagram of alternatively configured dimples shaped to have the maximum surface area for a disruptive influence on the fluid flow 55, which is parallel to the dimple layer.

Figure 13A:
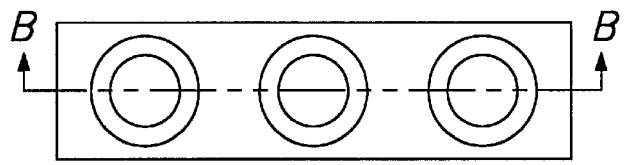
FIGS. 13A–B are top view and partial perspectives of a single-sided dimple layer stacked and connected dimple to dimple to a double-sided dimple layer; also shown is a third part, an interface connector between the dimple ends.
Figure 13B:
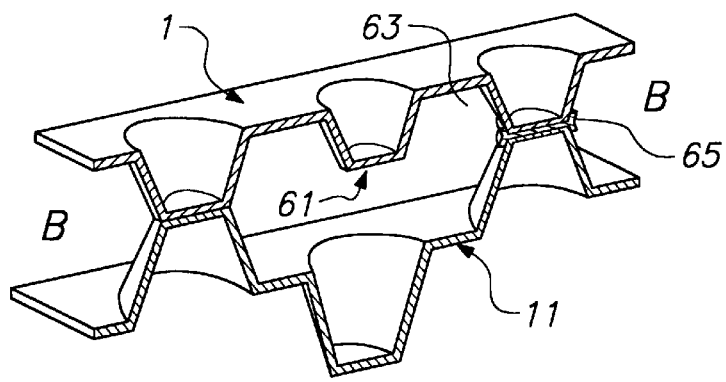

FIG. 13A is a top view and FIG. 13B is a partial perspective view of a single-sided dimple layer 1 stacked above and connected to a double-sided dimple layer 11. As can be seen, both the single-sided and double-sided dimple layers are uniform and symmetrical and every other dimple of the single-sided dimple layer lines up with every dimple of the double-sided dimple layer that extends from the first side. The adjacent dimple on the single-sided dimple layer 1 does not line up and is suspended 61, over the double-sided dimple layer 11 immediately above the dimple of the double-sided dimple layer 11 that extends away from the second side. This stacking leads to the creation of cavity 63. Additionally, a third part 65, whether it be an additional component, bracket, device, or material that fits between the dimples, can be used as a fastening method. The fastening methods used to connect any combination of dimples, dimple layers and/or reinforcing layers are endless in variety and not limited to those previously stated. There are many combinations of stacking single-sided and/or double-sided dimple layers and/or reinforcing layers and how they may or may not line up and/or connect together.

Figure 14A:
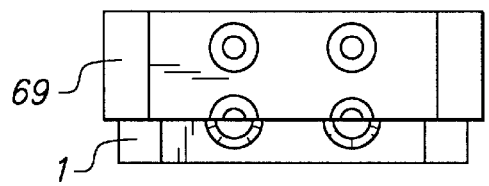
FIGS. 14A–C are top view, side view, and perspective view of a single-sided dimple layer used as a form, to produce a part that is like a single-sided dimple layer.
Figure 14B:
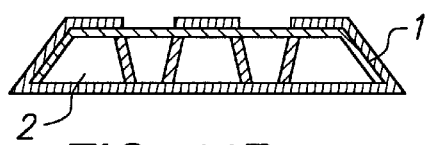
Figure 14C:
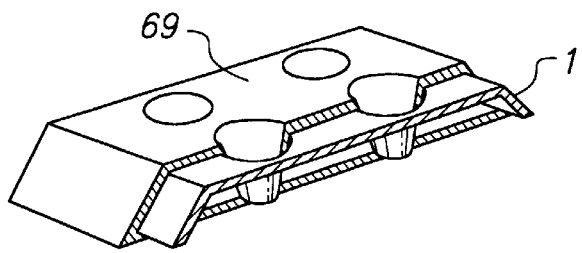

FIGS. 14A–C are various views of a single-sided dimple layer 1 with material 69 formed around it. The dimple layer 1, when placed on a surface, protects the cavity 2 while an outside layer is constructed over it. This application requires that the dimple layer be used as a form and may not have a function once the material is formed around it. For example, reinforced fiberglass materials could be used. A layer of fiberglass is first applied to a flat surface, the dimple layer is placed on top of that layer and glass fiber with resin is laminated over it and to the first layer. A one piece laminate is the result. After curing, the original dimple layer is trapped in the laminate. However, if a compatible but dissolvable material were used for the form, it could then be dissolved out of the fiberglass panel.

Figure 15A:
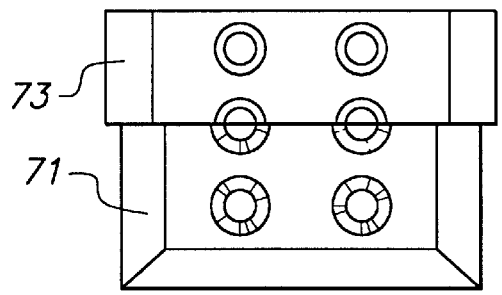
FIGS. 15A–C are a top view, side view, and perspective view of material formed around a solid object that is identical to the cavity created by a single-sided dimple panel.
Figure 15B:
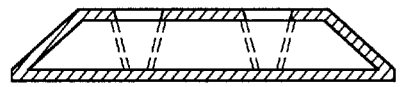
Figure 15C:
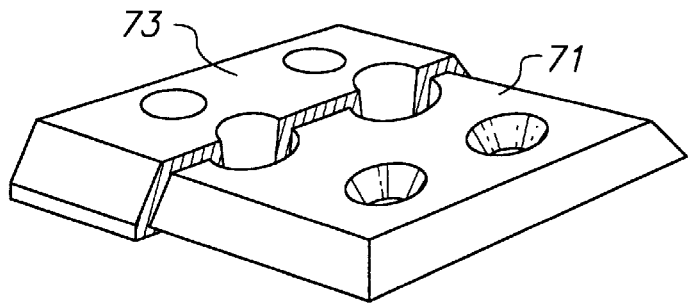

FIGS. 15A–C are various views of a solid object 71 that is identical to the cavity created by a single-sided dimple layer 1 and complimentary reinforcing layer 7, connected and used as, but not limited to, a mold for casting, coating or an immersion process. Other combinations and multiples of dimple layers and reinforcing layers may also use this method. FIGS. 15A–B utilize a solid shape to act as the mold. The application of material follows the form and creates a shape 73 that is the same as a connected dimple layer and reinforcing layer. Typical applications might include the use of a meltable/dissolvable or otherwise removable mold. After use, the mold is removed leaving the characteristic dimple panel shape.

Figure 16:
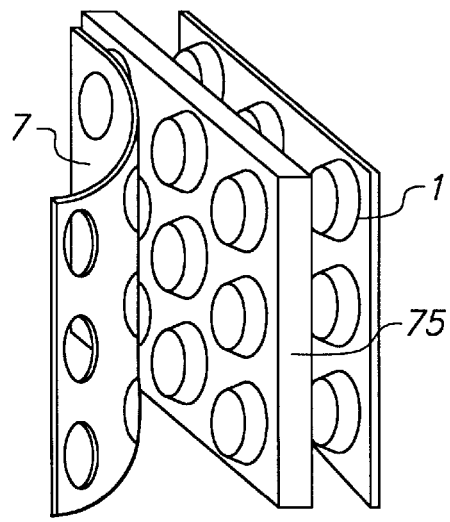
FIG. 16 is a partial perspective view of a single-sided dimple layer and reinforcing layer peeled away, used as a mold, with a solid part in between, that was made from the mold.

FIG. 16 is a partial perspective view of a single-sided dimple layer 1 and complimentary reinforcing layer 7 peeled away. The part 75 shown in between the layers is a solid, cast object formed by using the single-sided dimple layer 1 and reinforcing layer 7 as a mold. An alternative method, known as slip casting to potters, or roto molding in the plastics industry, would be to create a part from this mold, by coating the inside surfaces with casting material, while still connected. This process creates a hollow part instead of a solid. In this application, the cast part will be the product while the dimple panel is a re-enterable mold.

Figure 17:
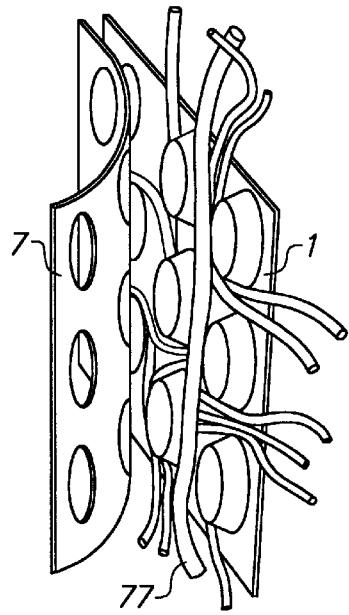
FIG. 17 is a perspective view of a single-sided dimple layer and reinforcing layer peeled away with cabling routed amongst the dimples.

FIG. 17 is a partial perspective view of a single-sided dimple layer 1 with a complimentary reinforcing layer 7 peeled away. In the cavity between the single-sided dimple layer 1 and reinforcing layer 7 is a series of cables 77 which are routed around the dimples on the dimple layer 1. This diagram shows that the panel, although connected, is re-enterable. Additionally, the spacing between the dimples on the dimple layer whether uniform or not, allows for the placement of materials such as, but not limited to, cabling and fibers to run throughout the cavity and enter and leave the dimple layer 1 at any edge of the panel. Not shown here, is the possibility of the cables or other medium, to enter and/or exit the panel through a passage in either the dimple layer 1 or reinforcing layer 7. A variety of such passages are shown in passages 43, 45, 47 in FIG. 11.

Figure 18:
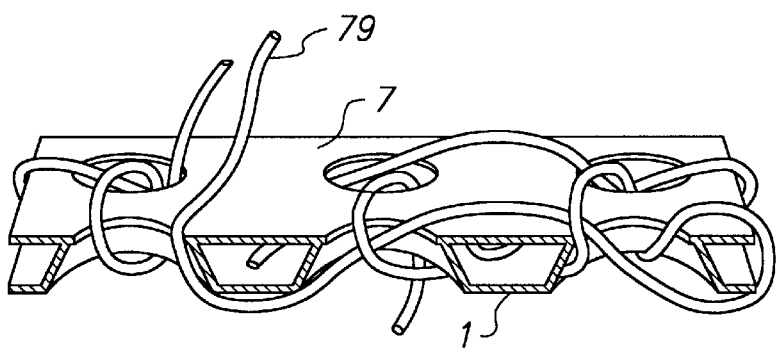
FIG. 18 is a partial perspective view of a single-sided dimple panel sewn together.

FIG. 18 is a partial perspective, cut away view of a single-sided dimple layer 1 and complimentary reinforcing layer 7 connected, with a strand material 79 routed through the dimple panel. Shown here, but not limited to, is a fibre that is easily weaved around and through the dimple panel to hold the dimple layer 1 and reinforcing layer 7 together. Other materials used for weaving might be, but are not limited to, plastic thread, glass fiber, metal fiber or cabling. This application would allow for a more rigid structural dimple panel such as found in filament wound products. This technique will not only create a strong, structural dimple panel but will also withstand high internal pressures. Additionally, many combinations of single-sided and double-sided dimple layer and reinforcing layers can be used in this process.

Figure 19A:
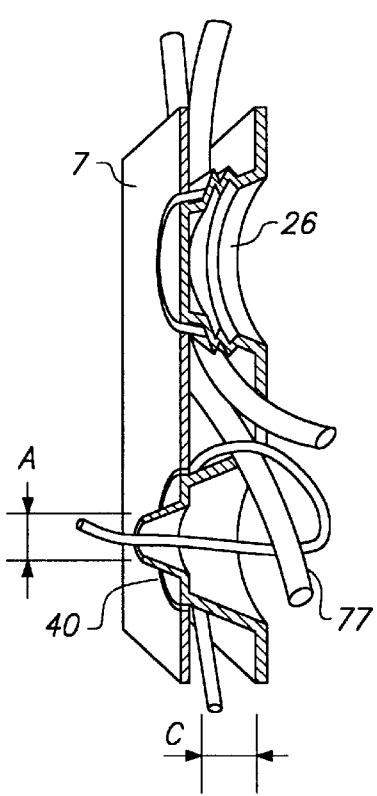
FIG. 19 shows two views of alternative dimples within a dimple panel of variable thicknesses.
Figure 19B:
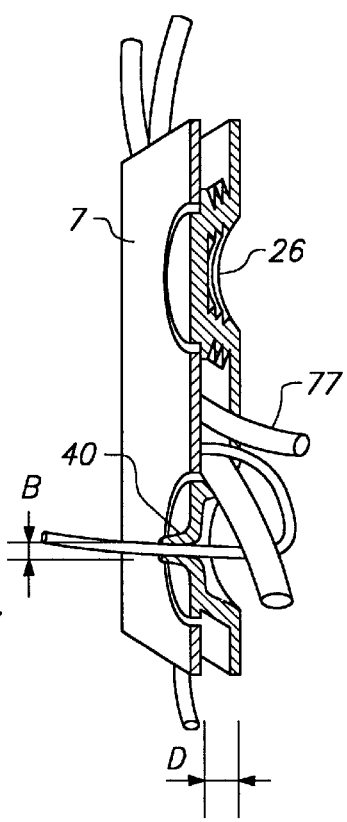

Shown in FIGS. 19A–B are two partial perspective, cut away views of a single-sided dimple layer 1 with two alternative dimples connected to a reinforcing layer 7. These drawings illustrate a collapsible dimple 26, and a memory material dimple 40. By collapsing or depressing dimple 26 and the recovery of the memory material of dimple 40, the distance between the dimple layer 1 and reinforcing layer 7 can be reduced from C to D. Also shown is A, a large passage in the end of dimple 40, and the same passage at B, reduced in size after heat recovery. This device could be used for, but is not limited to, a method of sealing wires, cables, or other materials, and may be constructed of many combinations of dimple layers and reinforcing layers.

Figure 20A:
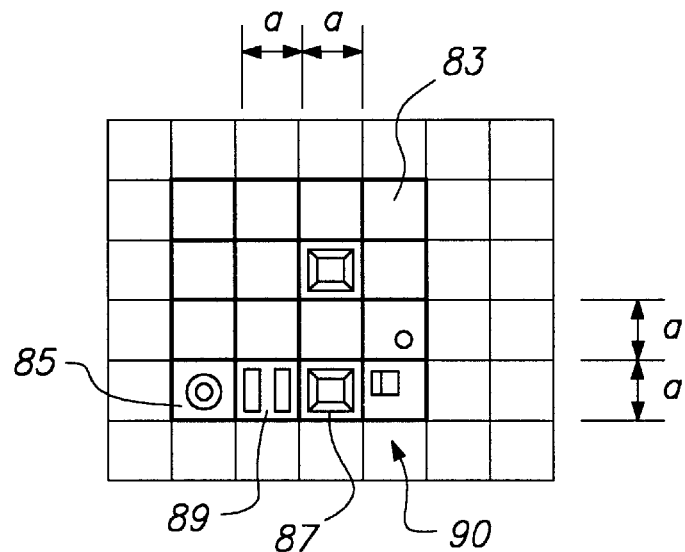
FIGS. 20A–B show an embodiment wherein a multi-piece mold can be used as a mold or die to form single-sided or double-sided dimple layers.
Figure 20B:
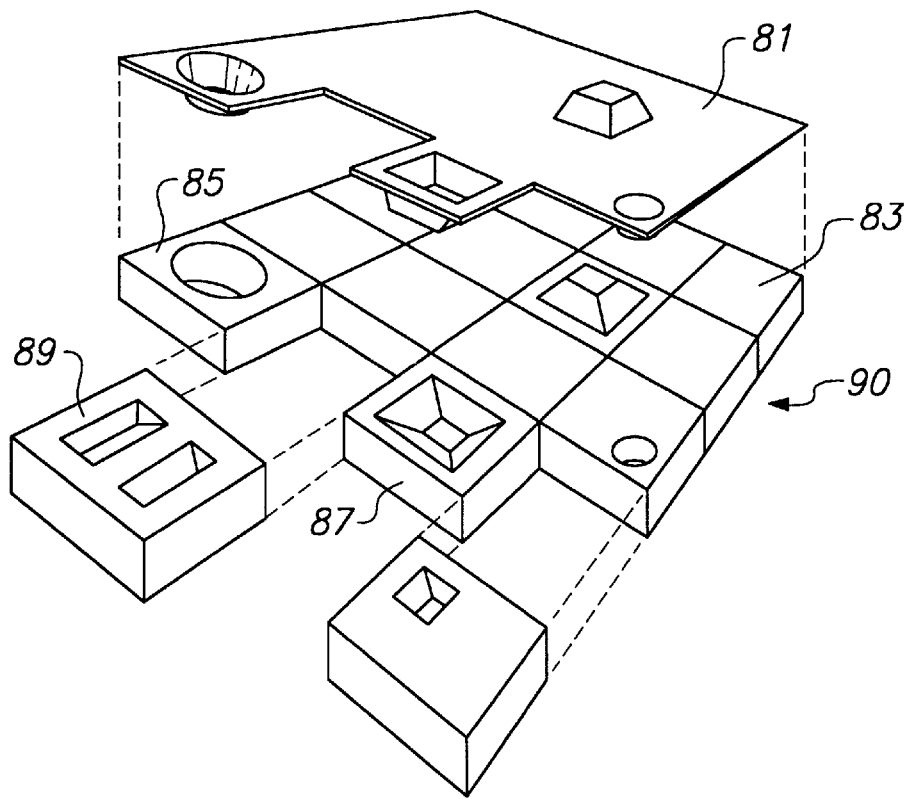

FIG. 20A shows a top view of a mold consisting of many small uniform mold pieces. Typical examples are mold pieces 83, 85 and 87. In this illustration, the mold pieces have the same exterior dimensions, shown as dimension "a." Each mold piece has a different mold shape, such as piece 85 having a pyramidal-shaped recess therein or a solid flat structure such as piece 83. When connected together, the pieces form a mold which will create a unique double-sided dimple layer 81, as shown in FIG. 20B. Individual mold pieces can be moved about or added, such as indicated by piece 89. This allows the construction of a mold having different and unique patterns. Further, the various pieces can vary in size and/or number to vary or alter the overall mold. The mold can be used to create single-sided dimple layers or double-sided dimple layers. As shown in FIG. 20B, the mold pieces are assembled to make a double-sided dimple layer mold 90 and suspended above the mold is a double-sided dimple layer 81 that conforms to the mold 90.

The foregoing has described the principles, preferred embodiments and modes of operation of the present invention. However, the invention should not be construed as being limited to the particular embodiments discussed. Thus, the above-described embodiments should be regarded as illustrative rather than restrictive, and it should be appreciated that variations may be made in those embodiments by workers skilled in the art without departing from the scope of the present invention as defined by the following claims.

What is claimed is:

1. A structural dimple panel, comprising:
a dimple layer having a plurality of dimples at least one of said dimples having a passage therethrough extending from a first side of the dimple layer; and
a reinforcing layer having openings therethrough comprising connection portions, said dimples penetrating at least some of said openings registering said layers, further including strand material routed through at least one of said passages and openings to mechanically interlock the layers.

2. The dimple panel of claim 1, wherein the reinforcing layer is generally planar.

3. The dimple panel of claim 1, wherein the dimple layer and the reinforcing layer are flexible enough to allow the dimple panel to be shaped into a nonplanar configuration as determined by the planar spacing adjustment.

4. The dimple panel of claim 3, wherein at least one of the dimples includes a fastening portion and the reinforcing layer includes a complimentary portion receiving the fastening portion wherein planar adjustments between the dimple layer and the reinforcing layer can be made.

5. The dimple panel of claim 1, wherein the reinforcing layer is nonplanar.

6. The dimple panel of claim 1, further comprising a biasing element located between the dimple layer and the reinforcing layer, the biasing element surrounding the at least one dimple and biasing the dimple layer away from the reinforcing layer.

7. The dimple panel of claim 1, wherein the dimples vary in height, width, shape, spacing and/or size.

8. The dimple panel of claim 1, wherein at least one of the dimples is collapsible.

9. The dimple panel of claim 1, wherein the reinforcing layer has at least one additional passage therethrough.

10. The dimple panel of claim 1, wherein the portion of the dimple forming the passage is of a memory material which allows the size of the passage and/or the distance between the layers to be changed when the memory material undergoes a change in temperature.

11. The dimple panel of claim 1, wherein the dimple layer is a single-sided dimple layer having the dimples on only one side thereof.

12. The dimple panel of claim 1, wherein the dimple layer is a double-sided dimple layer having the dimples on both sides thereof.

13. The dimple panel of claim 12, wherein the reinforcing layer engages the dimples on one side of the double-sided dimple layer.

14. The dimple panel of claim 1, wherein a cavity is defined between the dimple layer and the reinforcing layer and said cavity provides a passage for a liquid, solid or gaseous medium.

15. A multilayer dimple panel, comprising:
 a first dimple layer having a plurality of first dimples extending from a first side thereof and a plurality of second dimples extending from a second side thereof, at least one of said first dimples and one of said second dimples having passages therethrough;
 a first reinforcing layer having openings therethrough comprising connection portions, said first dimples penetrating at least some of said openings registering said first dimple layer and said first reinforcing layer; and
 a second reinforcing layer having openings therethrough comprising connection portions, said second dimples penetrating at least some of said openings registering said first dimple layer and said second reinforcing layer, and further including strand material routed through at least one of said passages and one of said openings to mechanically interlock the layers.

16. The dimple panel of claim 15, wherein the first and second reinforcing layers are generally planar.

17. The dimple panel of claim 15, wherein the first and second dimples have identical shapes.

18. The dimple panel of claim 15, wherein the reinforcing layers include connection portions in the form of openings therethrough receiving the dimples.

19. The dimple panel of claim 15, wherein the first dimple layer, the first reinforcing layer and the second reinforcing layer are flexible enough to allow the dimple panel to be shaped into a nonplanar configuration as determined by the planar spacing adjustment.

20. The dimple panel of claim 19, wherein at least one of the dimples includes a fastening portion thereon and the reinforcing layers includes a complimentary portion receiving the fastening portion wherein planar adjustments between a dimple layer and a reinforcing layer can be made.

21. The dimple panel of claim 15, wherein at least one of the dimples has an opening therethrough and at least one of the reinforcing layers includes an extension extending through the opening.

22. The dimple panel of claim 15, further comprising a biasing element located between the dimple layer and at least one of the reinforcing layers, the biasing element surrounding the at least one dimple and biasing the dimple layer away from the reinforcing layer.

23. The dimple panel of claim 15, wherein the dimples vary in height, width, shape, spacing and/or size.

24. The dimple panel of claim 15, wherein at least one of the dimples is collapsible.

25. The dimple panel of claim 15, wherein the at least one of reinforcing layers has at least one passage therethrough into the first or second cavity.

26. The dimple panel of claim 15, wherein the portion of the dimple forming the passage is of a memory material which allows the size of the passage and/or the distance between the layers to be changed when the memory material undergoes a change in temperature.

27. The dimple panel of claim 15, wherein the at least one of the first and second cavities provides passage for a liquid, solid or gaseous medium.

28. A multilayer dimple panel comprising:
 a first dimple layer and a second dimple layer, each dimple layer having dimples with at least one dimple of each layer having a passage therethrough; and
 a reinforcing layer between said first and second dimple layers, said reinforcing layers having openings therethrough, the dimples of said first and second dimple layers penetrating said openings registering said layers, and further including strand material routed through at least one of said passages and one of said openings to mechanically interlock the layers.

* * * * *